US008000263B2

(12) United States Patent
Janneteau et al.

(10) Patent No.: US 8,000,263 B2
(45) Date of Patent: Aug. 16, 2011

(54) METHOD AND APPARATUS FOR ROUTE OPTIMISATION IN NESTED MOBILE-NETWORKS

(75) Inventors: Christophe Janneteau, Gif-sur-Yvette (FR); Alexis Olivereau, Gif-sur-Yvette (FR); Alexandru Petrescu, Gif-sur-Yvette (FR); Hong-Yon Lach, Gif-sur-Yvette (FR)

(73) Assignee: Motorola Mobility, Inc., Libertyville, IL (US)

( * ) Notice: Subject to any disclaimer, the term of this patent is extended or adjusted under 35 U.S.C. 154(b) by 600 days.

(21) Appl. No.: 12/186,060

(22) Filed: Aug. 5, 2008

(65) Prior Publication Data

US 2009/0034499 A1    Feb. 5, 2009

Related U.S. Application Data

(62) Division of application No. 10/509,670, filed as application No. PCT/EP03/04183 on Apr. 18, 2003, now abandoned.

(30) Foreign Application Priority Data

May 30, 2002   (EP) ..................................... 02291331

(51) Int. Cl.
H04L 12/28   (2006.01)
H04L 12/56   (2006.01)
(52) U.S. Cl. ......... 370/254; 370/338; 370/392; 709/245
(58) Field of Classification Search ........................ None
See application file for complete search history.

(56) References Cited

U.S. PATENT DOCUMENTS

| 7,298,743 | B2 | 11/2007 | Markki et al. | |
|---|---|---|---|---|
| 7,421,512 | B2 * | 9/2008 | Ernst et al. | 709/238 |
| 7,561,553 | B2 * | 7/2009 | Venkitaraman et al. | 370/338 |
| 2003/0095523 | A1 * | 5/2003 | Korus et al. | 370/338 |
| 2003/0161287 | A1 * | 8/2003 | Venkitaraman et al. | 370/338 |
| 2008/0089257 | A1 * | 4/2008 | Markki et al. | 370/310 |

OTHER PUBLICATIONS

Ernst, Theirry: "Network Mobility Support in IPv6", Thesis Department of Mathematics and Computer Science, 'Online!, Oct. 29, 2001, URL:http://www.inria.fr, pp. 1-99.
Hu, Yih-Chun, Johnson, David B.: "Caching Strategies in On-Demand Routing Protocols for Wireless Ad Hoc Networks", MOBICOM 2000, Aug. 31, 2000, pp. 231-242.
Josh Broch et al.: "The Dynamic Source Routing Protocol for Mobile Ad Hoc Networks", IETF Internet Draft, Mar. 13, 1998.

\* cited by examiner

*Primary Examiner* — Robert C Scheibel

(57) ABSTRACT

The invention provides a method and apparatus for building a linked binding cache. The method includes storing mobile router entries in a binding cache. The mobile router entries include a first mobile router entry having a prefix and an indication of the prefix's length along with an associated intermediate address. The method also includes linking a second mobile router entry to the first mobile router entry for delivering at least one data packet via the first mobile router. The method further includes adding a pointer in the binding cache from the entry of the second mobile router to the first mobile router entry when the intermediate address of the second mobile router matches the first mobile router's prefix in order to create a linked binding cache.

7 Claims, 11 Drawing Sheets

METHOD AND APPARATUS FOR ROUTE OPTIMISATION IN NESTED MOBILE-NETWORKS

CROSS-REFERENCE TO RELATED APPLICATION

This application claims priority from PCT patent application number PCT/EP03/04183, entitled "DATA FLOW BETWEEN A COMMUNICATION UNIT AND A NODE WITHIN A MOBILE NETWORK," filed Apr. 18, 2003, which claims priority from EPC patent application number 02291331.3, entitled "DATA FLOW BETWEEN A COMMUNICATION UNIT AND A NODE WITHIN A MOBILE NETWORK," filed May 30, 2002. This application is a divisional of U.S. patent application Ser. No. 10/509,670, entitled "DATA FLOW BETWEEN A COMMUNICATION UNIT AND A NODE WITHIN A MOBILE NETWORK," filed Sep. 28, 2004, now abandoned, which applications are commonly owned and incorporated herein by reference in their entirety.

FIELD OF THE INVENTION

This invention relates to telecommunication systems in which data flows between mobile nodes, for example personal digital assistants with wireless communication capability, and a data network, for example the Internet.

BACKGROUND OF THE INVENTION

The Internet is becoming more and more popular, and users increasingly wish to access the Internet whilst on the move. Different types of mobile nodes (i.e. mobile communication units) may be employed for this purpose, for example a mobile telephone or a personal digital assistant (PDA) with wireless communication capability.

Increasingly, mobile users are accessing the Internet via different types of fixed or wireless access networks, for example a cellular radio communication network, such as a Universal Mobile Telecommunication System (UMTS) network, a HiperLAN/2 or IEEE 802.11b local area network, a Bluetooth local communication system, or fixed accesses such as the Ethernet, and so on. The data route between the mobile node and the Internet further comprises an Internet protocol subnet (IP subnet), such that the route is as follows: mobile node-access network-IP subnet-Internet (and reverse order for the data route from the Internet to the mobile node).

It is currently possible to seamlessly handover accessing of the Internet from one access network to another, for example by using a protocol known as Mobile-IP.

Traditional mobility support aims to provide continuous Internet connectivity to mobile hosts, thereby allowing individual mobile users to connect to the Internet whilst being mobile and moving their Internet access location. In contrast, network mobility support is concerned with situations where an entire network changes its point of attachment to the Internet topology and thus its accessibility in the topology. Such a network in movement can be called a Mobile Network.

There exist a large number of scenarios where such Mobile Networks exist. For example, a Personal Area Network (PAN, i.e. a network of several personal devices attached to an individual) is known whereby the PAN changes its point of attachment to the Internet topology whilst the user is walking in a shopping mall. In addition, a network may be embedded in a bus or aircraft, providing on-board Internet access to passengers. A passenger may use a single communication device (e.g. a laptop) or be itself a Mobile Network (e.g. a PAN). Notably, this configuration illustrates a case of a Mobile Network visiting a Mobile Network (i.e. nested mobility).

As such, a Mobile Network can be defined as a set of nodes composed of one or more IP-subnets attached to a Mobile Router (MR). These IP subnets may also be viewed as a mobile unit, with respect to the rest of the Internet, i.e. a MR and all its attached nodes (so called Mobile Network Nodes or MNNs).

A document authored by Thierry Ernst, Hong-Yon Lach, IETF Internet-Draft draft-ernst-monet-terminology-00.txt, February 2002, describes a list of definitions for the Mobile Network terminology that can be applied in this application. In particular, the following terms may be defined as follows:

(i) A Local Fixed Node (LFN):

A node permanently located within the Mobile Network and that does not change its point of attachment. A LFN can either be a Local Fixed Host (LFH) or a Local Fixed Router (LFR).

(ii) A Local Mobile Node (LMN):

A local mobile node is one that belongs to the Mobile Network and changes its point of attachment from a link within the Mobile Network to another link within or outside the Mobile Network. In this regard, it can be assumed that the home link of the LMN is a link within the Mobile Network. A LMN can either be a Local Mobile Host (LMH) or a Local Mobile Router (LMR).

(iii) A Visiting Mobile Node (VMN):

A VMN is one that does not belong to the Mobile Network, and changes its point of attachment from a link outside the Mobile Network to a link within the Mobile Network (i.e. the home link of the VMN is not a link within the Mobile Network). A VMN that attaches to a link within the Mobile Network obtains an address on that link. A VMN can either be a Visiting Mobile Host (VMH) or a Visiting Mobile Router (VMR).

(iv) A Mobile Network Prefix:

A bit string that consists of a number of initial bits of an IP address, which identifies a Mobile Network within the Internet topology. Nodes belonging to the Mobile Network (i.e. at least MR, LFNs and LMNs) share the same IPv6 "network identifier". For a single mobile IP-subnet, the Mobile Network Prefix is the "network identifier" of this subnet.

(v) An Egress Interface of a MR:

This is the interface attached to the home link if the Mobile Network is at home. Alternatively, it is the interface attached to a foreign link if the Mobile Network is in a foreign network.

(vi) An Ingress Interface of a MR:

This is the interface attached to a link inside the Mobile Network. This interface is configured with the Mobile Network Prefix.

(vii) A MR May have Multiple Egresses and Ingress Interfaces.

Recently, there has been a lot of interest and research into the Mobile IPv6 specification, as described in the document authored by David B. Johnson: IETF Internet-Draft draft-ietf-mobileip-ipv6-15.txt, July 2001. A major concern with Mobile Ipv6 is that the research has proven that the IPv6 standard is currently unable to adequately address network mobility. In particular, the document authored by Thierry Ernst and Hong-Yon Lach: IETF Internet-Draft draft-ernst-mobileip-v6-network-02.txt, June 2001, details problems encountered with Mobile-IPv6 in supporting Mobile Networks.

In summary, it has been determined that even if a MR's Home Agent (HA) is able to intercept packets addressed to MNNs that are operating behind the MR, the MR's HA is clearly unable to encapsulate them to the care-of-address of the appropriate MR. Note that every data packet has a source address and a destination address. A tunneled packet is a packet that encapsulates in it another packet. Thus, the encapsulating packet has a pair of source and destination addresses. A further encapsulated packet has additional source and destination addresses.

The lack of knowledge of a true location of a particular MNN results from the HA not knowing any (never mind a preferred) data route to the Mobile Network, once it has moved to a 'visited' location. Unfortunately, when a MR registers with its HA the MR only informs the HA to record a host-specific route in its routing table. The inventors of the present invention have recognised that a preferred network route generated using the mobile network address (prefix, prefix length and care-of-address) of the appropriate MR would greatly assist in this matter.

In the field of this invention, the Mobile IPv4 specification, detailed in C. Perkins, IETF RFC 3220, "IP Mobility Support for IPv4", Standards Track, January 2002, describes how Network Mobility can be supported in the case of IPv4 mobility. However, it has also been determined that IPv4 does not support route optimisation for MNNs behind the MR. Thus, all the (incoming and outgoing) traffic between a MNN and its corresponding nodes (CNs) is passed to the MR's Home Agent. This problem is exacerbated in the case of nested mobility, which is where a CN wishes to pass data to a MNN that is behind a number of MR links, or a mobile node visiting a mobile network. In the case of nested mobility, the packet will thus be encapsulated several times as a result of being routed through all of the Home Agents of all the nested MRs. This is clearly inefficient routing.

A solution to this routing problem is presented in the document authored by T. J. Kniveton: IETF Internet-Draft draft-kniveton-mobrtr-00.txt, November 2001, where provision of a means to support mobile networks with no modifications to Mobile IP (v4 or v6) is described. The mechanism proposed to address the problem of nested mobility is described with respect to FIG. 2. When a MR, for example MR2 260, has attached to a visited network 110 (via another Mobile Network MR1 link), a bi-directional tunnel 210, 215, 220 is established between MR2 260 and its HA-HA2 250. When a node, for example LFN2 165, is attached to MR2 260 and wishes to send an IP packet to a CN, say CN2 255, via the Internet 115, that packet is tunneled by MR2 260 (to HA2 250) and again by MR1 150 (to HA1 240). The multiple-tunneled data packet is then passed to the HA of the latest MR to tunnel the data, namely to HA1 240. HA1 240 then forwards it to the intended recipient CN2 255 via the source MR's HA, namely HA2 250.

This proposed data routing method, and the problems associated with it, are best described by way of an example. Thus, let us assume that LFN2 165 sends a data packet to CN2 255. The data packet is first routed 205 towards MR2 260. The data packet is then tunneled by MR2 260 to be sent to HA2 250. This tunneling process of the data packet from MR2 260 to HA2 250 is itself, by necessity, first routed 210 towards its linked MR, namely MR1 150. MR1 150 further tunnels the data and forwards 215 the multiple-tunneled packet to its HA, namely HA1 240. HA1 240 de-tunnels the data packet, as tunneled by MR1 150 and forwards 220 the partially de-tunneled packet to its original intended recipient, HA2 250. HA2 250 further de-tunnels the packet, as tunneled by MR2 260, and forwards 225 the wholly de-tunneled data packet to CN2 255.

Clearly, the solution proposed does not provide any support for route optimisation, since both inbound and outbound packets are routed through the Home Agent of both MRs 150, 260. In fact, packets from CN2 255 addressed to LFN2 165 will follow the same path (in reverse order) and will then be encapsulated by each Home Agent 240, 250 of each of the nested MRs 150, 260. Once again, this is clearly inefficient routing, particularly for a practical situation whereby there may be many more than two levels in the nested network.

The solution presented in a document authored by Thierry Ernst and Hong-Yon Lach: IETF Internet-Draft draft-ernst-mobileip-v6-network-02.txt, June 2001, proposes a means for supporting network mobility in the framework of Mobile IPv6. This solution introduces the following concept: when a Mobile Router roams to a visited network, it sends a Prefix Scope Binding Update to its Home Agent (HA). Unlike a classical Mobile IPv6 Binding Update message, a Prefix Scope Binding Update does not bind a home address with a care-of address.

In contrast, the MR Prefix is bound with the MR care-of address, for a particular MR. Upon reception of a packet whose prefix matches with the MR prefix, the Home Agent must then tunnel the packet to the MR care-of-address that has been identified as being able to deliver the tunneled packet to the intended recipient. Likewise, a MR may send prefix-scope BUs to the corresponding nodes of the nodes it serves. This solution brings a more efficient support of mobile networks to Mobile IPv6, since it may provide a limited improvement to route optimisation.

However, the scope of this draft has explicitly excluded the case of nested mobility, which presents a significant hurdle to efficient route optimisation. As such, the solution proposed in the Thierry Ernst document, IETF Internet-Draft draft-ernst-mobileip-v6-network-02.txt, June 2001, fails to provide a useful solution to route optimisation in many practical situations. Again, the problems that emanate from this document, particularly in the case of nested mobility, are best highlighted in an example situation.

Referring now to FIG. 3, a mechanism for routing data packets in an IPv6 network using the proposal of Thierry Ernst: IETF Internet-Draft draft-ernst-mobileip-v6-network-02.txt, June 2001. Notably, the problems emanating from using this mechanism in a nested mobility are highlighted.

A mobile router MR1 150 is attached to a visited link 110. A mobile router MR2 260 is attached to MR1's link 155. A local fixed node LFN2 165 is attached to MR2's link 230. Again, let us assume that LFN2 165 is attempting to communicate with a corresponding node CN2 255.

Let us further assume that, at the beginning of the simple scenario detailed in FIG. 3, MR1 150 and MR2 260 have already sent BU messages to their respective HAs 240, 250. That is, HA1 240 knows that MR1's 150 prefix is reachable at MR1's care-of address. Similarly, HA2 250 knows that MR2's 260 prefix is reachable at MR2's care-of address.

When a data packet is sent from CN2 255 to LFN2 165, CN2 255 has no knowledge about LFN2's 165 actual location. Thus, the data packet that it sends is therefore routed 325 towards home link-2 105. HA2 250 intercepts the data packet and tunnels it to MR2's care-of address. This can be understood as HA2 250 knows that MR2's prefix is reachable at MR2's care-of address.

This tunneled packet (from HA2 250 to MR2's 260 care-of address) is routed 320 toward link-1 245, since MR2's 260 care-of address matches MR1's 150 prefix. HA1 240 intercepts the data packet and tunnels it to MR1's care-of address, namely towards the visited link 110, since HA1 240 knows that MR1's prefix is reachable at MR1's care-of address.

MR1 150 then de-tunnels the data packet received from HA1 240. MR1 150 then forwards the content to the original recipient, MR2 260. Meanwhile, MR1 150 sends a Binding Update to the sender of the encapsulated packet (that is HA2 250) to inform it that MR1's prefix is reachable at MR1's care-of address. Note that from MR1's point of view, HA2 250 is a Correspondent Node and not its Home Agent (i.e. the 'H' bit in the BU is not set). It is up to the HA2 250 to accept this Binding Update or not.

MR2 260 de-tunnels the data packet that it received (i.e. the portion of the data packet that had been encapsulated by HA2 250) and forwards the content (the initial packet from CN2 255) to LFN2 165. Meanwhile, MR2 260 sends a Binding Update message to the sender of the encapsulated packet (that is, CN2 255) to inform it that MR2's prefix (covering the LFN2 165 address) is reachable at MR2's care-of address. This information is stored in the CN's binding cache 370.

Once an initial packet has reached its destination, transmission of a second or subsequent packet from CN2 255 to LFN2 165 leads to the scenario depicted in FIG. 4. After having reviewed its binding cache 370, CN2 255 recognises that LFN2 165 is reachable at MR2's care-of address. Thus, it sends the data packet to MR2's care-of-address with a routing header for LFN2 165. MR2's care-of-address belongs to MR1's link and is therefore routed towards Home Link-1 245. In this manner, a minor improvement to route optimisation is achieved by the bypassing of the transmission of the data packet to, and from, HA2 250.

HA1 240 then intercepts the data packet and tunnels the packet to MR1's care-of address, since HA1 240 knows that MR1's prefix is reachable at MR1's care-of address.

MR1 150 de-tunnels the packet from HA1 240 and forwards the content to the mobile router MR2 260 of the originally intended recipient, LFN2 165. Meanwhile, MR1 150 sends a Binding Update to the sender of the encapsulated packet (that is, CN2 255) to inform it that MR1's prefix is reachable at MR1's care-of address.

When receiving the original packet as sent by CN2 255, MR2 260 replaces its address in the destination field of the packet with the address contained in the routing header (that is, LFN2 165) and forwards the data packet to the ultimate recipient.

The inventors of the present invention have identified a significant problem with the scenario depicted in FIG. 4. All subsequent packets from CN2 255 to LFN2 165 will be routed in exactly the same manner as the second data packet. That is, there will be no subsequent improvement towards route optimisation. This is more clearly shown in respect of FIG. 5.

Referring now to FIG. 5, a known binding cache 500 is illustrated. The binding cache comprises a list of entries, specific to each MR in a nested mobility scenario. The binding cache entries include, for example a MR3 prefix and prefix length 530, with a link 532 to a determined MR3 care-of-address 534, if one has been determined. The MR3 entry 535 is linked 536 to the next entry in the binding cache, namely that for MR2. The MR2 prefix and prefix length 520, includes a link 522 to a determined MR2 care-of-address 524, if one has been determined. A similar arrangement and link 526 is performed to MR1, and so on.

In addition, the binding cache entries include a flag entry (not shown). A 'P' flag is the "Prefix Scope Registration" flag. When it is set, a "Home Address" field is filled with the Mobile Network prefix (the prefix that is advertised by the Mobile Router) and the "Prefix Length" corresponds to the length of the Mobile Network prefix.

It is specified in the document by Thierry Ernst: IETF Internet-Draft draft-ernst-mobileip-v6-network-02.txt, June 2001, that the Binding Cache is searched for an entry corresponding to the destination address of the packet in one pass. As a result of the search, either nothing has been found (no entry), or the full address has been found (128-bit match for an IPv6 address, P flag unset), or the first bits of the destination address match with a registered prefix for the registered prefix length. In the latter case, the destination is located in a mobile network.

Therefore, with reference to FIG. 4, when CN2 255 has to send a packet to LFN2 165, CN2 255 still reviews its binding cache and finds the entry 'MR2 260 prefix reachable at MR2 260 Co@' 520, 524. CN2 255 does not even consider the entry 'MR1 150 prefix reachable at MR1 Co@' 510, 514, as this would appear to have no bearing on the LFN2 address. The inventors have recognised that this deficiency results from the LFN2 165 address being unrelated to the MR1 prefix. The fact that MR2 260 Co@ belongs to MR1 prefix is neither seen, nor even used by CN2 255.

Consequently, the only optimisation that the Thierry Ernst proposal can support is related to the HA (HA2 250) of the MR (MR2 260) serving the communicating MNN (LFN2 165 in the above example). This solution describes indeed a means for having packets be sent directly from CN2 255 to HA1 240, instead of CN2 255 to HA2 250 and thereafter to HA1 240. However, if there were n successive levels of nested mobility, this solution provides minimal route optimisation, no more than having a CN2 255→$HA_{n-1}$→$HA_{n-2}$→ . . . → HA1 path instead of CN2 255→$HA_n$→$HA_{n-1}$→$HA_{n-2}$→ . . . →HA1 path. This proposal is therefore still clearly inefficient, particularly in the case of nested networks.

A need therefore arises for a mechanism, apparatus and associated methods to support route optimisation in Network mobility, especially in the case of IPv6. In particular, a need has arisen to support route optimisation in the case of nested mobility, wherein the aforementioned problems are substantially alleviated.

Figure 6:
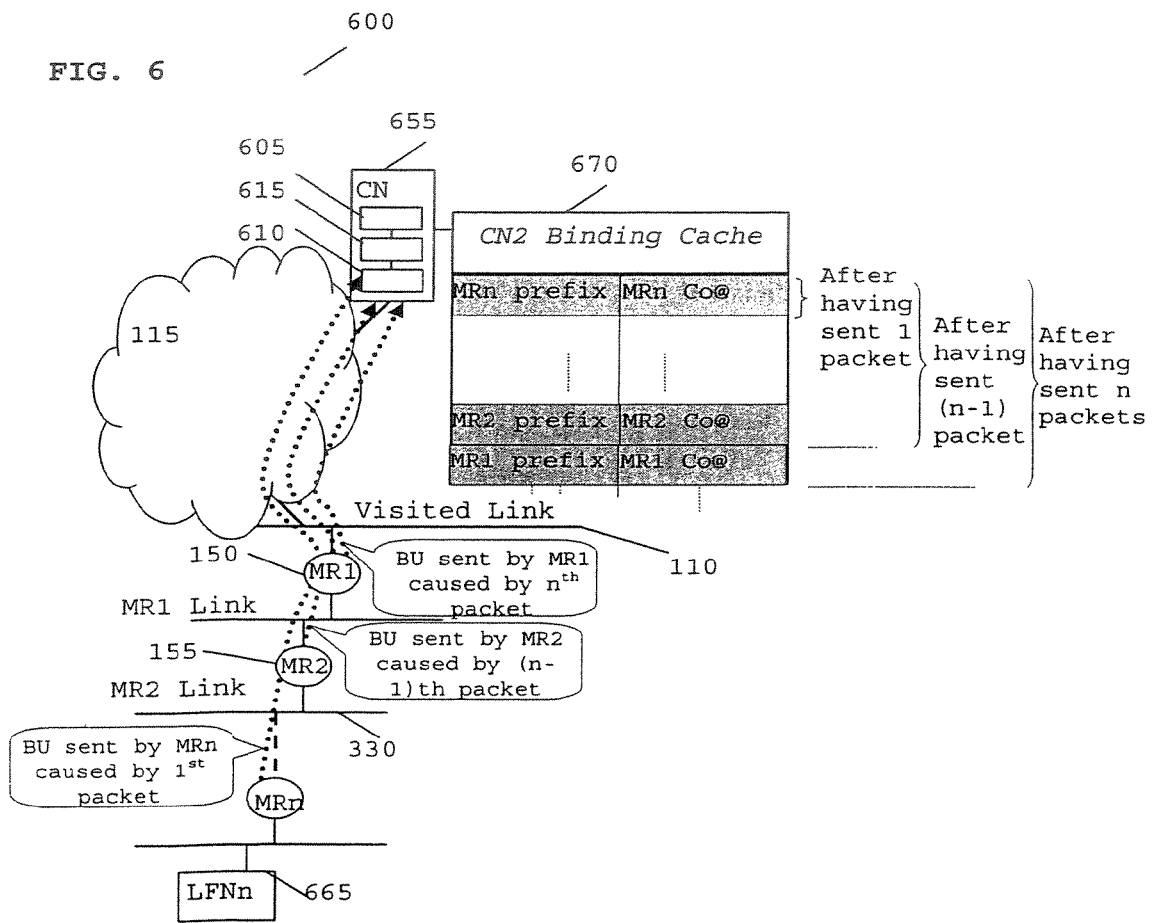
Figure 7:
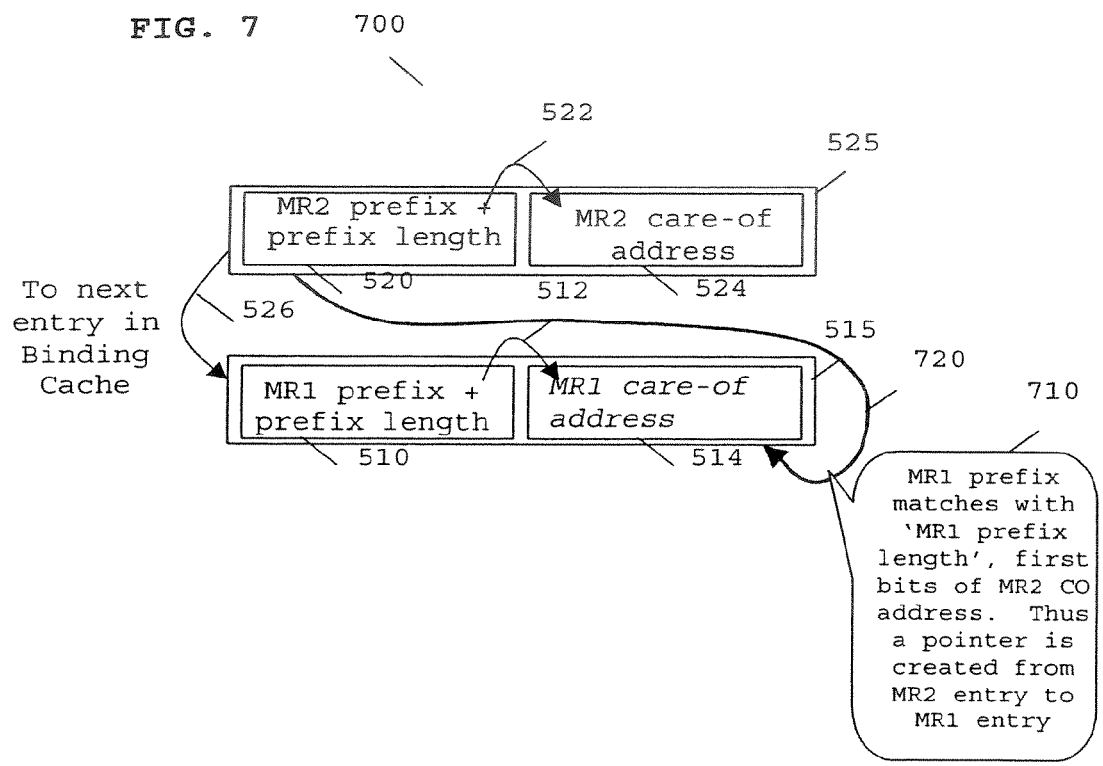
Figure 8:
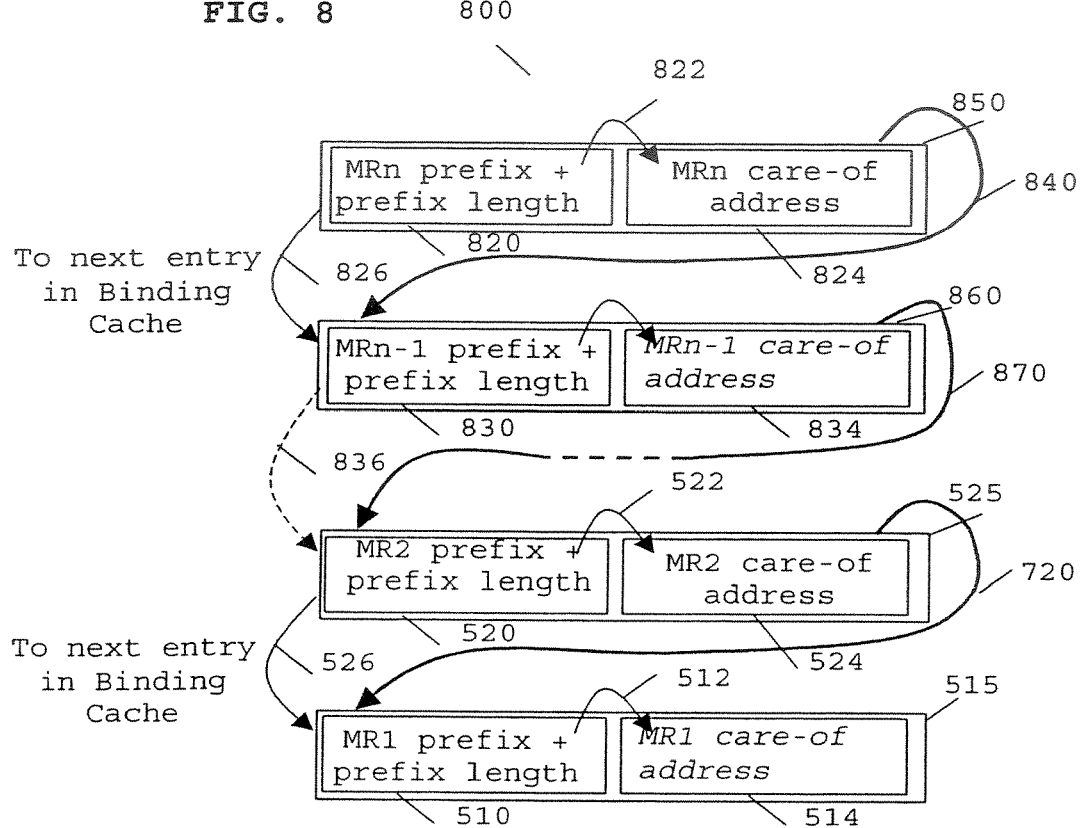
Figure 9:
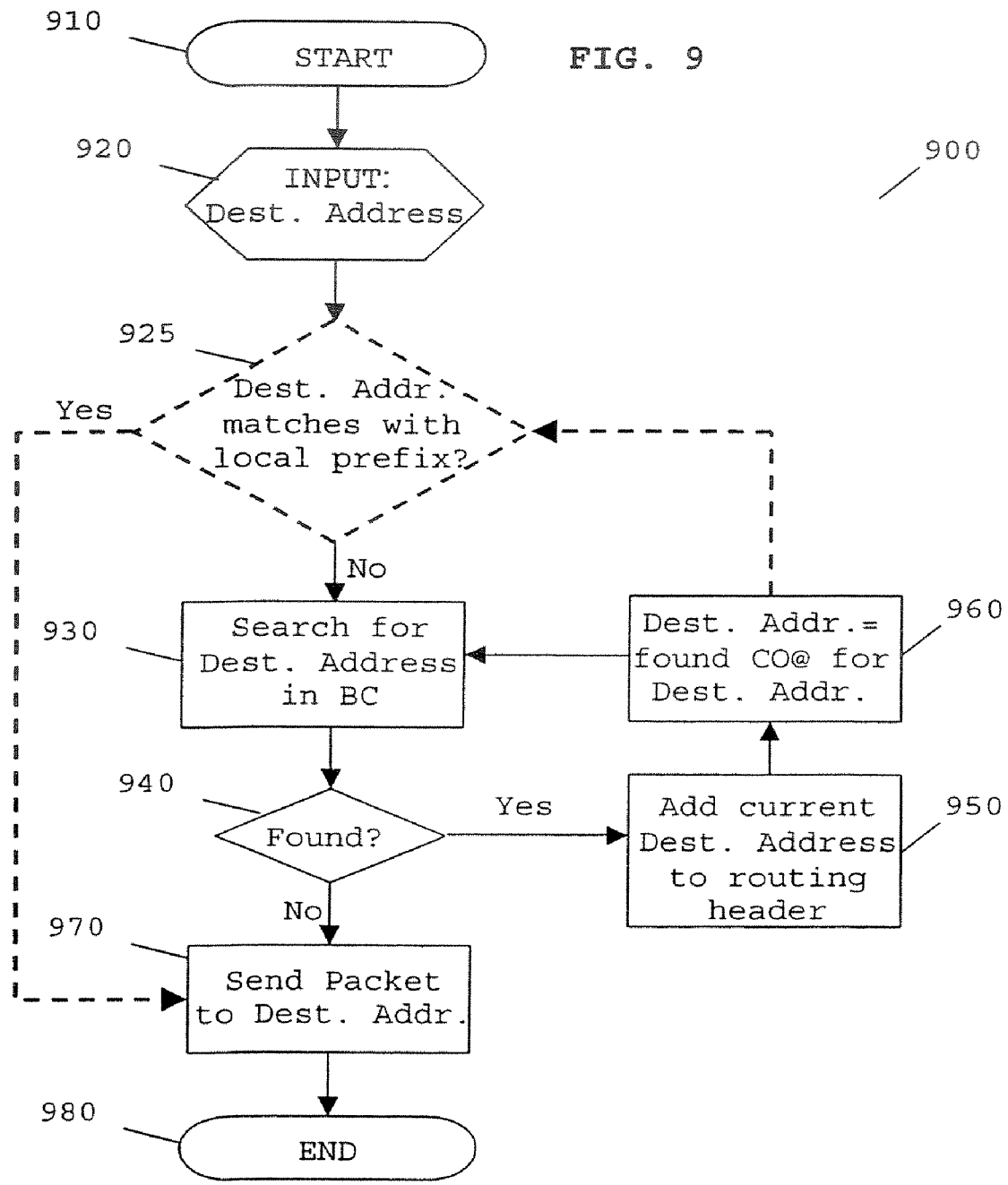
Figure 10:
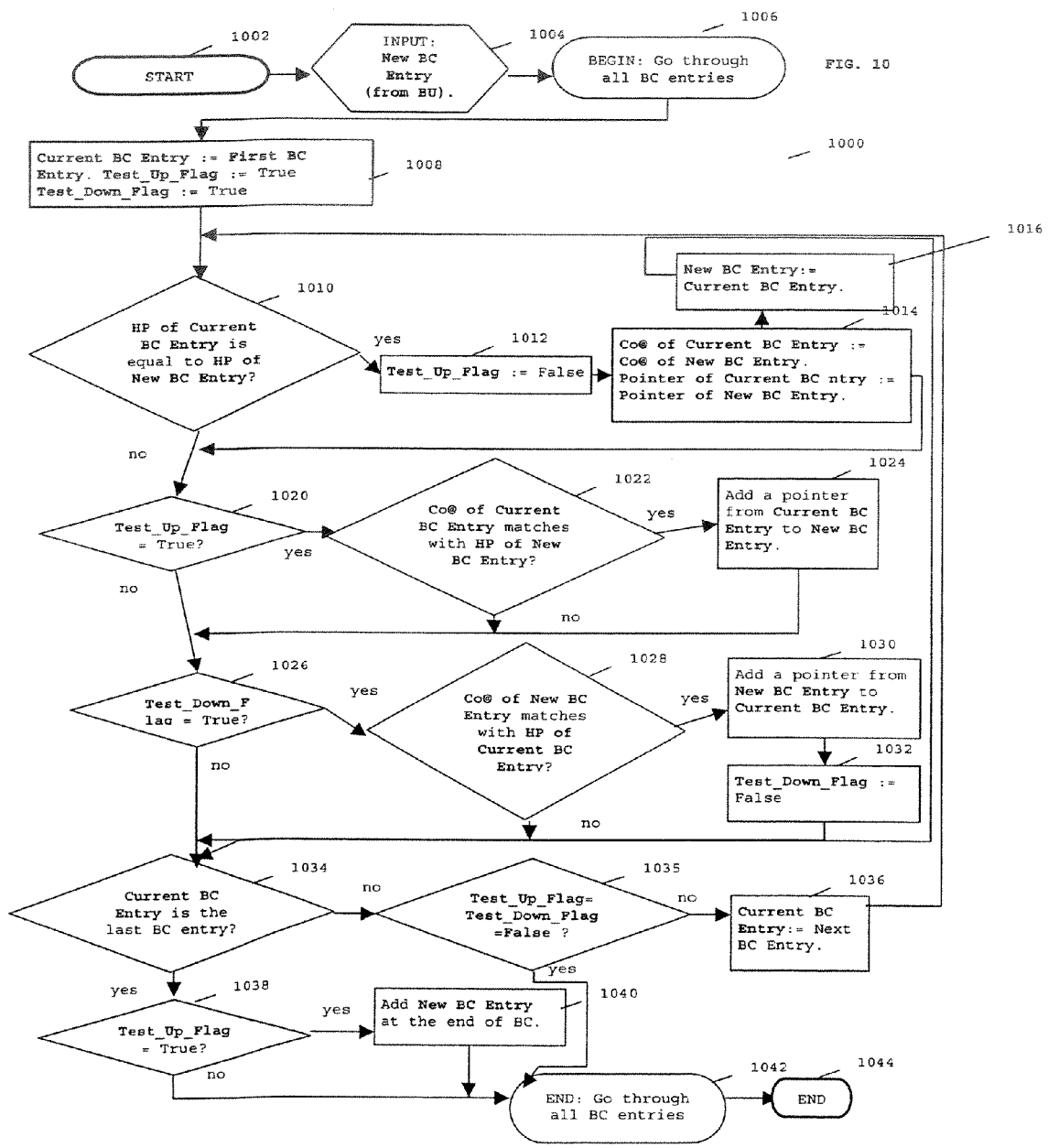

Exemplary embodiments of the present invention will now be described, with reference to the accompanying drawings, in which:

FIG. 6 illustrates a packet data routing mechanism for mobile networks when applied to nested mobility in accordance with the preferred embodiment of the present invention;

FIG. 7 illustrates a simple linked binding cache configuration in accordance with the preferred embodiment of the present invention;

FIG. 8 illustrates a generic linked binding cache configuration in accordance with the preferred embodiment of the present invention;

FIG. 9 illustrates a flowchart of a process of accessing address information from a linked binding cache in accordance with the preferred embodiment of the present invention; and FIG. 10 illustrates a flowchart of a method to build a linked binding cache in accordance with the preferred embodiment of the present invention.

Figure 11:
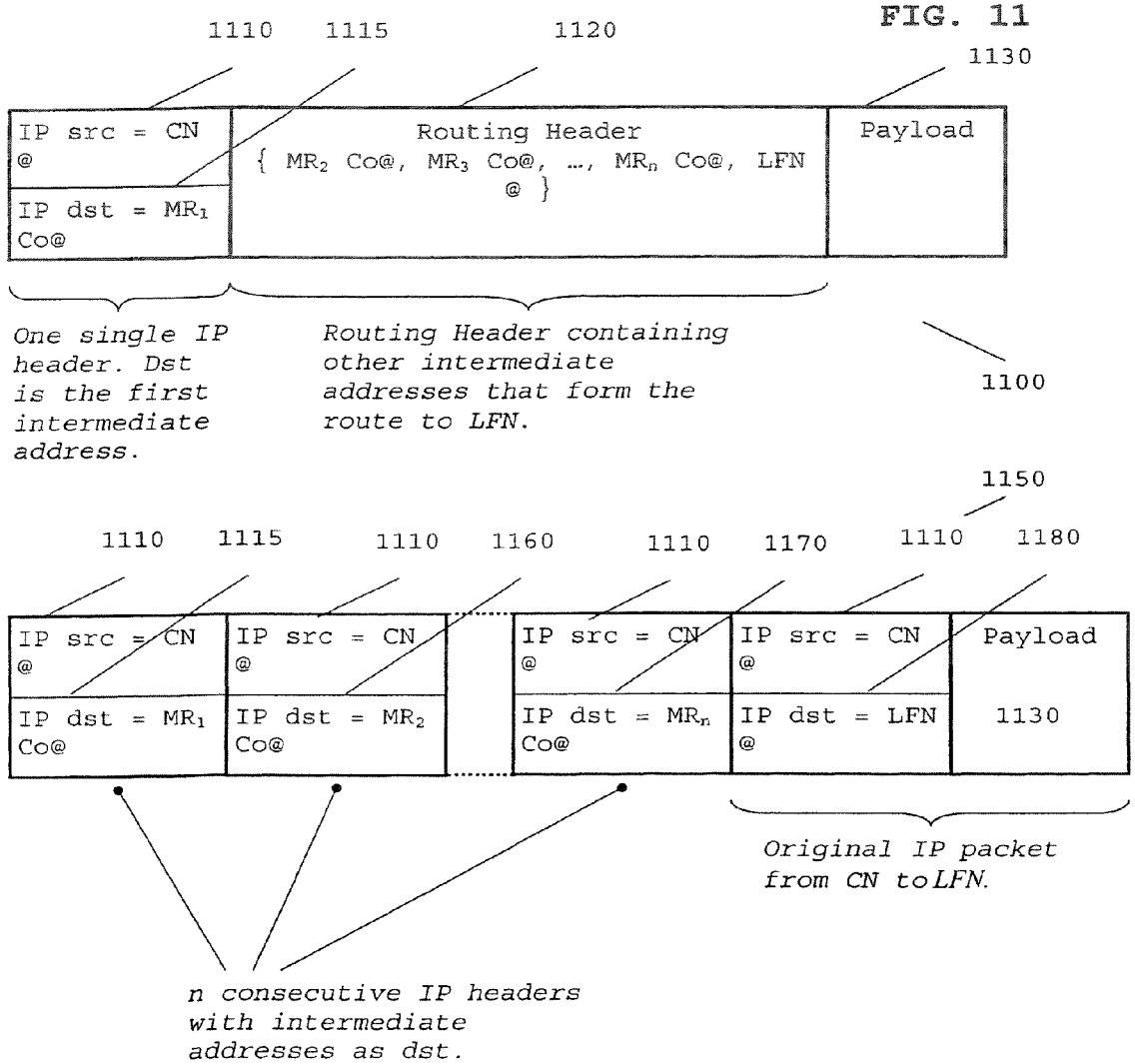

FIG. 11 illustrates preferred examples of routing headers, generated in accordance with embodiments of the present invention.

DESCRIPTION OF PREFERRED EMBODIMENTS

There is currently no standard mechanism to support Network mobility adequately, particularly in the case of IPv6 for nested mobility data networks. In particular, there is no provision or support for route optimisation. This is a major issue, as nested mobility is a very realistic scenario for Mobile Router applications. In addition route optimisation is much more important with regard to movement of a Mobile Network, than for movement of a single Mobile Node, since the amount of traffic handled is much greater.

The preferred embodiment of the present invention is described with respect to route optimization in transmitting at least one data packet between a corresponding node (communication unit) and a local fixed node (or vice versa). It is envisaged that the corresponding node may be any communication unit capable of sending a data packet across a data network (such as the Internet), for example, a web server, a PC, or a workstation running a web server. The CN may also be any mobile data communication unit such as a general packet radio system (GPRS) device or a $3^{rd}$ generation (3G) cellular phone, a personal digital assistant (PDA), etc., connected to the data network through any type of access.

Referring now to FIG. 6, a packet data routing mechanism 600 for mobile networks is illustrated; particularly one supporting nested mobility, in accordance with the preferred embodiment of the present invention. A skilled artisan would recognise that the number of elements shown in the network of FIG. 6 are limited for clarity purposes only.

The new mechanism provides route optimisation, i.e. determining the shortest direct path for communication between a MNN's Correspondent Nodes and this MNN. The preferred embodiments of the present invention find particular applicability in nested mobility scenarios (that is Mobile Networks visiting Mobile Networks). The improvement is primarily achieved by adding intelligence to a Corresponding Node (CN) 655.

The CN 655 in accordance with the preferred embodiment of the present invention has been adapted to include (i.e. at least generate, update and search) a new binding cache. The new binding cache is a linked binding cache 670 that provides pointers between cache addresses to improve data packet route optimisation. An adapted processor 605 that is operably coupled to the linked binding cache 670 performs the generation, updating and searching of the linked binding cache 670. The processor is coupled to, or contains, a routing process 610, to generate data packet routes based on the pointers stored in the linked binding cache 670. An interface 615 is provided on the CN 655 to facilitate the improved delivery of data packets from CN 655. The operation of the CN 655, processor 605, the routing process 610 and the linked binding cache 670 are described in greater detail in the sections below.

Adaptation of the CN 655 may be implemented by configuring or adapting any suitable element, for example processor 605. Alternatively, a new processor implementing processor-implementable instructions and/or stored on a suitable storage medium, such as computer memory, hard disk, floppy disk, ROM, PROM etc, may be used to implement the processes described. The processor may, in some configuration, be a computer, a network of computers, or one or more dedicated processors.

More particularly, in the case of those performed by the CN, a memory element (not shown) other than the binding cache 670, for storing data or processes used in the delivery of data packets may be adapted.

Figure 1:
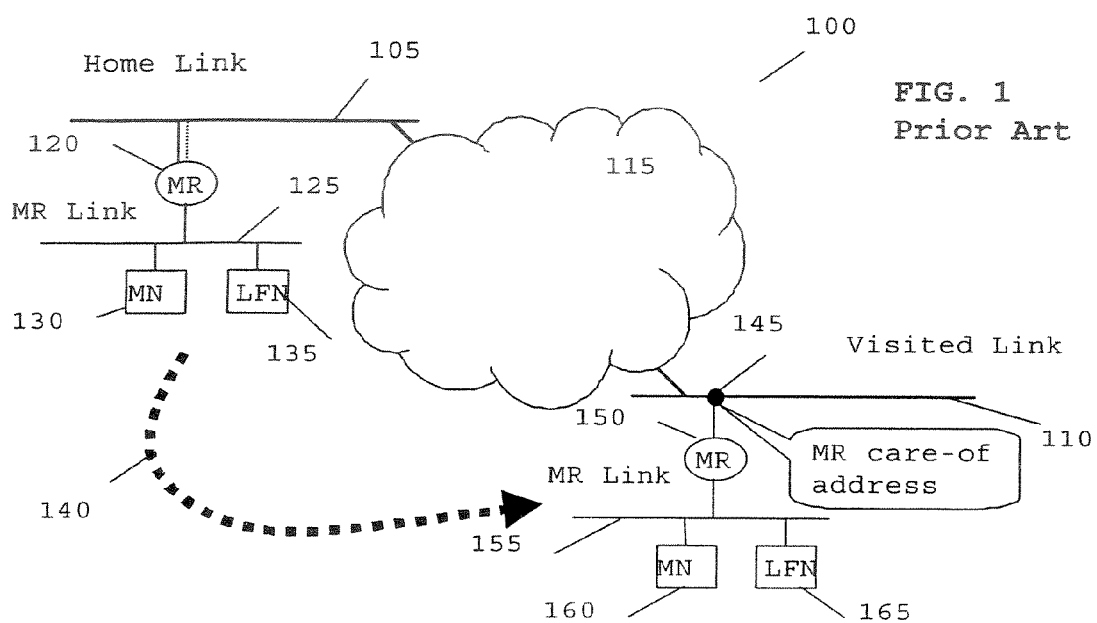
FIG. 1 illustrates the movement of a Mobile Network in an Internet.
Figure 2:
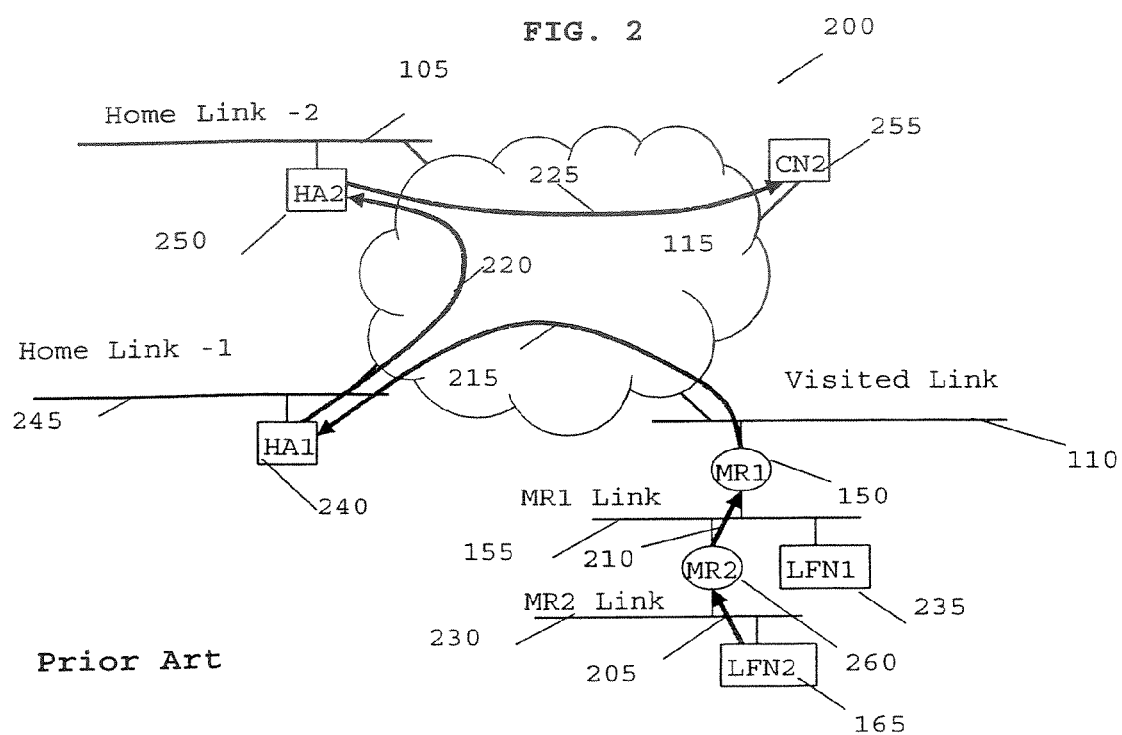
FIG. 2 illustrates a known packet data routing mechanism for mobile networks when applied to nested mobility.
Figure 3:
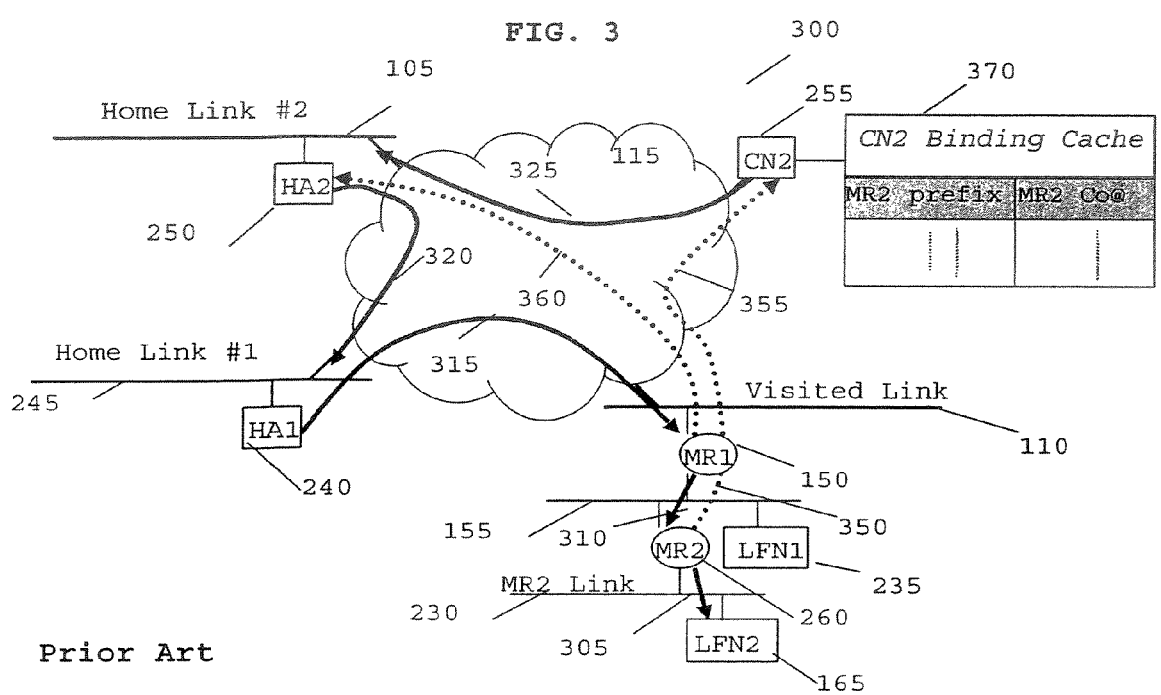
FIG. 3 illustrates a known packet data routing mechanism for mobile networks when applied to nested mobility that highlights the inefficiency of the data routing.
Figure 4:
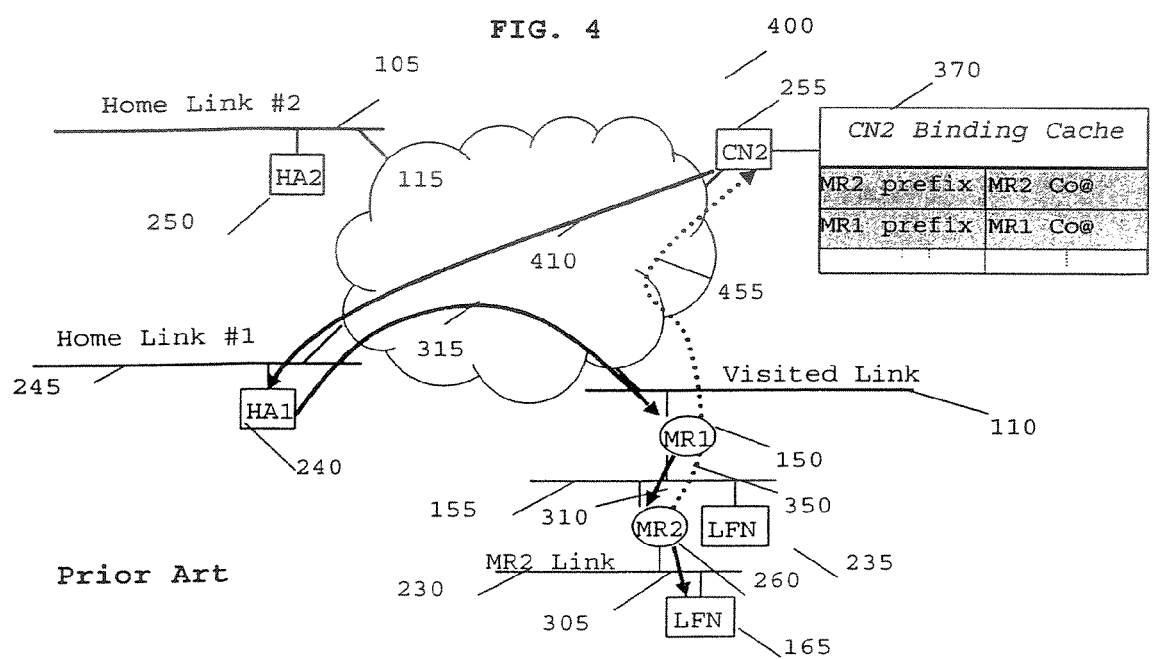
FIG. 4 illustrates a known packet data routing mechanism for mobile networks when applied to nested mobility that highlights the inefficiency of an improved process of the data routing.

Notably, the scenario in FIG. 6 illustrates how the mechanism described with relation to FIG. 4 may be extended and improved to provide an adequate solution in nested mobility situations.

As described above with reference to FIG. 4, when CN2 255 has to send a packet to LFN2 165, CN2 255 reviews its binding cache and finds the entry that the MR2 260 prefix is reachable at the MR2 care-of-address 520, 524. Hence, for all data packets being sent to LFN2 165, CN2 255 sends the data packet to MR2's care-of address that will intercepted by HA1 240, the home agent of MR1 150.

The inventors of the present invention propose to extend the above technique by incorporating intelligence in the CN. In this regard, as shown in FIG. 6, when the CN 655 is about to send a data packet to any mobile node (MN) or fixed node, for example LFNn 665, CN 655 reviews its binding cache following a defined pattern. In the known technique, the CN (CN2 255) reviews its binding cache and finds the MR entry (i.e. the MR2 260 prefix is reachable at the MR2 care-of-address 520, 524) and stops at this point. In contrast to the known technique, when a registered intermediate address (i.e. a care-of-address) has been found for MN (or MN prefix if MN is behind a mobile router), this care-of-address is again searched in the binding cache. If the care-of-address is covered by a prefix for which a BU has been received, the corresponding new care-of-address is searched and so on. Meanwhile, the routing header of the outbound packet is constructed so that it includes all (care-of/intermediate) addresses that have been successively found within the binding cache 670. The construction of the routing header is shown in greater detail in FIG. 11.

In this manner, the full route for the data packet can be determined by improved extraction and utilisation of data within the improved binding cache.

If we consider the example depicted in FIG. 6 the following process would occur when a data packet is to be sent from CN 655 to LFNn 665. CN 655 searches its linked BC 670 entries for LFNn address. If the LFNn address is based on MR2 prefix (that is, LFNn address and MR2 prefix first 'MR2 prefix length' bits are identical), the MR2 care-of-address is returned. The CN 655 then searches its linked BC 670 entries for the MR2 care-of address, which is based on the MR1 prefix (that is: MR2 care-of-address and MR1 prefix first 'MR1 prefix length' bits are identical). Thus, the MR1 care-of-address is returned. The CN 655 then searches its linked BC 670 entries for the MR1 care-of address. Notably, nothing is returned. Therefore, the linked binding cache search ends, and the CN 655 has knowledge of the optimum route to be used for the data packet to reach the intended recipient.

Thus, CN 655 knows that the data packet has to be sent first to MR1 150, at MR1's care-of-address. CN 655 also knows that once MR1 150 forwards the data packet to MR2 155, MR2 155 is able to pass the data packet to its intended recipient LFN 665. Note that these further hops have been stored in memory (either cache or an alternative memory) in order to build the Routing Header for that (and any subsequent) data packet to be sent to LFN 665, as described further below.

The process shown in FIG. 6 illustrates a practical scenario, where many nested levels may exist. Hence, the aforementioned process may be easily generalized to an example of nested mobility involving n successive levels (n mobile routers $MR_1, \ldots, MR_n$ and n corresponding home agents $HA_1, \ldots, HA_n$). In this regard, let us assume that a local fixed node LFN is attached to $MR_n$ and the LFN is communicating with a corresponding node CN.

In the following description, the following nomenclature is used:

A '➔' represents a tunneled packet,
whereas
A '→' represents a "normal" packet, possibly containing a Routing Header.

A first data packet CN→LFN is sent through in the following manner:

$CN \to HA_n \to \ldots \to HA_1 \to MR_1 \to \ldots \to MR_n \to LFN$.

Notably, $MR_n$ de-tunnels the packet from $HA_n$ and sends a prefix scope BU to CN 655, informing CN 655 that $MR_n$ prefix is reachable at $MR_n$ care-of address.

Subsequently, a next packet CN→LFN is sent through in the following manner:

$CN \to HA_{n-1} \to \ldots \to HA_1 \to MR_1 \to \ldots \to MR_{n-1} \to MR_n \to LFN$.

$MR_{n-1}$ de-tunnels the packet from $HA_{n-1}$ and sends a prefix scope BU to CN 655 informing CN 655 that the $MR_{n-1}$ prefix is reachable at the $MR_{n-1}$ care-of address. On receipt of the BU, the CN 655 recognises that the packet has been sent to link n−1 (and then intercepted by $HA_{n-1}$), as the CN 655 knows that the LFN is contactable by $MR_n$ link and that $MR_n$ is currently at $MR_n$ care-of address, which is coupled to link n−1.

Subsequently, a next data packet to be sent from the CN 655 to the LFN leads to the following CN operation. The LFN matches with the $MR_n$ prefix, so the $MR_n$ care-of-address is returned. The $MR_n$ care-of-address matches with $MR_{n-1}$ prefix, so the $MR_{n-1}$ care-of-address is returned. Notably, the $MR_{n-1}$ care-of-address does not match with any prefix ($MR_{n-2}$ binding update has not been received yet). Thus, the packet is sent through in the following manner:

$CN \to HA_{n-2} \to \ldots \to HA_1 \to MR_1 \to \ldots \to MR_{n-2} \to MR_{n-1} \to MR_n \to LFN$.

Since it receives a tunneled packet, $MR_{n-2}$ sends a prefix scope binding update to CN 655.

Ultimately, the next packets lead to the CN operating in the following manner. The LFN address matches with $MR_n$ prefix. Hence, the $MR_n$ care-of-address is returned. The $MR_n$ care-of-address matches with $MR_{n-1}$ prefix. Hence, the $MR_{n-1}$ care-of-address is returned. Following the same principle through the nested mobility network, the $MR_3$ care-of-address matches with the $MR_2$ prefix. Hence, the $MR_2$ care-of-address is returned. Notably, the $MR_2$ care-of address does not match with any prefix, as $MR_1$ BU has not been received yet. Thus, the packet is sent through in the following manner:

$CN \to HA_1 \to MR_1 \to MR_2 \to \ldots \to MR_n \to LFN$.

Since it receives a tunneled packet, $MR_1$ then sends a prefix scope binding update to CN 655.

The CN 655 then has a complete route mapped out for sending data packets to LFN. Hence, when the next packet is to be sent, the CN 655 operates in the following manner. The LFN matches with $MR_n$ prefix. Hence, the $MR_n$ care-of-address is returned. The $MR_n$ care-of-address matches with $MR_{n-1}$ prefix. Hence, the $MR_{n-1}$ care-of-address is returned.

And so on, until the $MR_2$ care-of-address matches with $MR_1$ prefix. Hence, the $MR_1$ care-of-address is returned. The $MR_1$ care-of-address does not match with any prefix (which is to be expected, as the MR1 is not visiting a mobile router). Thus, the data packet is sent through in the following manner:

$CN \to MR_1 \to MR_2 \to \ldots \to MR_n \to LFN$.

Notably, the data packet is sent through with the minimum of de-tunneling operations, thereby achieving ideal route optimisation.

Advantageously, no restriction is placed on the sender of the data packet or the intended recipient. Hence, the preferred embodiments apply in the same manner, whether the sender or intended recipient is either fixed or mobile, for example, the sender may be a fixed CN or a Mobile Node (MN), and the intended recipient may be a Mobile Network or a fixed node (i.e. LFN) or a mobile node at home in the Mobile Network (i.e. LMN) or a Mobile Node visiting a Mobile Network (i.e. VMN).

Furthermore, in the preferred embodiment of the present invention, the search in the Linked Binding Cache does not stop after an initial entry has been found. On the contrary, the search continues until the returned care-of-address fails to match with any mobile router prefix for the first 'MR prefix length' bits of the address being searched.

In accordance with the preferred embodiment of the present invention, a new method of building a Routing Header for outbound packets has been described, as above. Using the generated routing header, as explained in the previous section, after reception of the Binding Updates from all intermediate MRs, the packets are sent through in the following manner:

$CN \to MR_1 \to MR_2 \to \ldots \to MR_n \to LFN$.

This efficient routing operation is achieved through the recovery of all intermediate MR care-of addresses, whilst determining the last MR (the care-of-address to which the packet has to be sent) in the sequence. In this example, once the binding cache information has been generated as above, the $MR_n$ care-of-address is searched in the Linked Binding Cache. It is then found that the $MR_n$ care-of-address matches with $MR_{n-1}$ prefix. Thus, $MR_{n-1}$ care-of-address is searched for. However, notably, the $MR_n$ care-of-address is not lost or discarded, but is added to the routing header, in accordance with the preferred embodiment of the present invention.

Hence, the routing header is dynamically constructed. In the first packets sent (before any Binding Update is received), there is no routing header and the destination address is the LFN address. In the packets to be sent after reception of Binding Update from MRn, the routing header consists of the LFNn address and the data packets are sent to the $MR_n$ care-of address. Subsequent data packets to be sent are addressed as will be understood from the aforementioned description. In the last data packets, sent after reception of a Binding Update from the last intermediate MR (i.e. MR1), the routing header consists of the following: {$MR_2$ care-of address, $MR_3$ care-of address, ..., $MR_n$ care-of address, LFNn address}. The data packets are then sent to the $MR_1$ care-of address.

The mechanisms described above for determining the destination address and building the Routing Header for CN outbound packets achieves route optimisation for data packets addressed to LFN in n steps, where the $1^{st}$ packets are sent without any optimisation, and the last packets are sent with full optimisation (once the n Binding Updates from the n intermediate MRs have been received one after the other by CN). The full route optimisation is achieved in incremental steps since a Binding Update from an intermediate MR (e.g.

MRn−i) will be received by the CN only once the Binding Update from the lower MR (i.e. MRn−i+1) has been received. This is due to the fact that MRs send their first Binding Update to CN only once they received a data packet from CN that has been encapsulated by their own HA. This implies that in the best case, full route optimisation is only achieved for the (n+1)$^{th}$ packet sent by CN to LFN, where the n previous packets have consecutively triggered the emission of Binding Updates from the n intermediate MRs in the following order (MRn, MRn−1, . . . , MR2, MR1).

In accordance with an enhanced embodiment of the present invention, a method of determining a destination address and building a routing header in a single step is described. Thus, in summary in the enhanced embodiment, route optimisation may be achieved in a single step as follows:

A 1$^{st}$ packet is sent without any optimisation, and

A 2$^{nd}$ packet and all the subsequent packets are sent with full optimisation, that is CN→MR$_1$→ . . . MR$_n$→LFN.

This enhancement to obtain route optimisation in a single step is based on extensive MR de-tunneling. In summary, route optimisation was obtained in n steps in the above example because MR$_n$ is the only MR to send a BU to CN in the first step. Similarly, MR$_{n-1}$ is the only MR to send a BU to CN in the second step (data packet sent after BU from MRn has been received), and so on. The inventors of the present invention have recognised that route optimisation may be achieved in a single step if all MRs send a BU to the CN in the first step, with a modified de-tunneling technique.

Such a modified technique extends the known art, as described in the Thierry Ernst proposal, in: IETF Internet-Draft draft-ernst-mobileip-v6-network-02.txt, June 2001. Here, it is specified that a Mobile Router must send a BU "to the source address of the inner packet" when receiving a tunneling packet from its Home Agent. That inner packet may very well be itself a tunneling packet. In this context, the MR does not inspect the content of the data packet.

Therefore, the inventors propose that, in order to achieve route optimisation in a single step, the MR has to send a binding update to the source address contained in the innermost-tunneled packet. That innermost tunneled packet is the packet that is not itself a tunneling packet. Note however that each of the nested MRs must only de-tunnel one level (partially de-tunnel) before forwarding the packet; de-tunneling the whole packet is done internally only for obtaining the BU destination.

As described above, a key feature of the present invention is the increased intelligence in the CN, coupled to the new processes in building and using the CN's linked binding cache.

Figure 5:
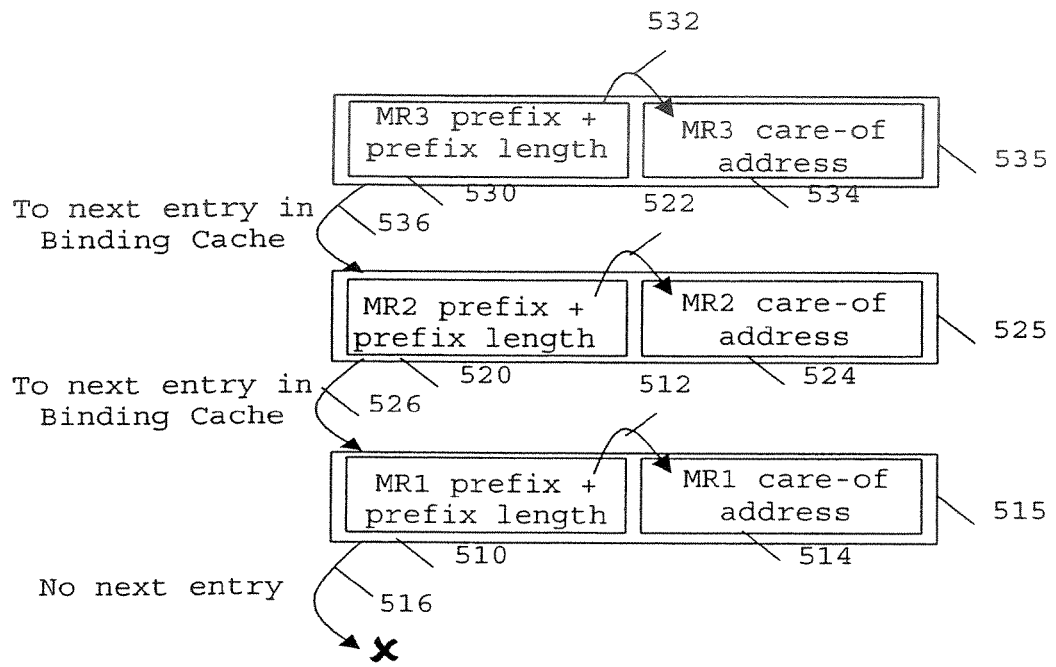
FIG. 5 illustrates a known binding cache for routing data packets in mobile node networks.

Existing binding caches, as shown in FIG. 5, can be viewed as a list of two-element lists. Here, each entry consists of a home address (+ possibly the prefix length in case of a prefix entry) and the corresponding care-of address. The inventors of the present invention have also proposed an improved mechanism for building a linked binding cache. The method described above requires the CN to run through its binding cache 'n' times, in the case of nested mobility involving 'n' levels of mobile routers, in order to build the linked binding cache.

However, in accordance with the preferred embodiment of the present invention, it is proposed that the linked binding cache is built by adding direct pointers from an entry A to another entry B, when the care-of-address of entry A fits into the range defined for the other entry B prefix. It is envisaged that the processor 605 would build the linked binding cache 670, using the MR care-of-address information received through interface 615 and processed by processor 605.

For the simple network scenario shown in FIG. 4, whereby LFN is reached via a first MR (MR1) 150 and a second MR (MR2) 260, the entry of MR2 260 has been adapted to reference (direct pointer) the entry of MR1 150. This linked binding cache arrangement 670 is illustrated in FIG. 7. As before a binding cache address comprises a list of addresses, specific to each MR in a nested mobility scenario. The binding cache entries may include, for example, a MR2 prefix and prefix length 520, with a link 522 (internal to each entry) to a determined MR2 care-of-address 524, if one has been determined. The MR2 entry 525 is linked 526 to the next entry in the binding cache, namely that for MR1. The MR1 prefix and prefix length 510, includes a link 512 to a determined MR1 care-of-address 514, if one has been determined. A similar arrangement and link may be performed to MR3, and so on.

In accordance with the preferred embodiment of the present invention, the linked binding cache 700 has been identified as individual entries for each MR, namely MR1 entry 515 and MR2 entry 525. This reflects the entry link between the prefix and prefix length to any care-of-address that has been identified for that MR. The binding cache has been adapted to include a pointer 720 between the respective MR entry, for example MR2 entry 525 and the MR1 entry 515, thereby creating a linked binding cache 670.

It is within the contemplation of the present invention that such a pointer 720 may be effected between the source entry and the care-of-address of the pointed entry, or from the source entry to the MR prefix and prefix length (510) of the pointed entry.

The above methodology can be extended to the case of an n-level nested mobility, as shown in FIG. 8. For a generic n-level nested mobility network scenario, the linked binding cache arrangement 800 includes 'n' individual BC entries 515, 525 . . . 860, 850. As before in FIG. 7, each BC entry includes fields relating to the MR prefix and prefix length, with the associated care-of-address, if known, specific to each MR.

The binding cache entries may include, for example, a MR2 prefix and prefix length 520, with a link 522 to a determined MR2 care-of-address 524, if one has been determined. The MR2 entry 525 is linked 526 to the next entry in the binding cache, namely that for MR1. The MR1 prefix and prefix length 510, includes a link 512 to a determined MR1 care-of-address 514, if one has been determined. This arrangement and associated links are translated to the MRn−1 and MRn links as shown in FIG. 8.

In accordance with the preferred embodiment of the present invention, the binding cache 800 has been adapted to include links 720, 870, 840 between the respective MR entry and the other entries it points to, thereby creating a generic linked binding cache. A direct pointer is added from an entry A to an entry B if and only if entry B prefix matches with the 'entry B Prefix Length' first bits of entry A care-of-address. In FIG. 8, the pointer 840 has been included since MRn−1 prefix matches with the 'MRn−1 Prefix Length' first bits of MRn care-of-address, and so on.

Advantageously, the creation and use of this linked binding cache (i.e. binding cache extended with the direct pointers as described above) requires minor modifications to existing binding caches and associated searching algorithms. In this regard, the respective MR care-of-addresses are highlighted as being linked to entries whose prefix match the care-of addresses. This is achieved in the routing process, by routing process function 610. Furthermore, by implementing the inventive concepts described herein, a CN is no longer limited to determining a single care-of-address, based on a determination of the initial routing MR—particularly in the case of nested network mobility. The routing process 610 in the CN is able to map the whole route, through successive MRs, that a data packet would need to take to reach its intended recipient. In this manner, route optimisation of the data packet can be achieved.

In summary, the linked binding cache effectively generates a data route for the data packet to be sent, in contrast to existing binding caches that identify a single address (including prefix, prefix length and a single care-of-address, if known).

Referring now to FIG. 9, a flowchart 900 illustrates the preferred method of searching through a binding cache, in accordance with the preferred embodiment of the present invention. The method is performed at the CN, and starts at step 910.

Once a CN receives a request to send a data packet to a destination address, in step 920, the CN searches for that destination address in its binding cache. If the destination is found in step 940, the address is added to the routing header, as shown in step 950. The care-of-address of the 'found' destination address is then used to replace, in step 960, the destination address to be searched in step 930.

Note that the aforementioned search method in the BC is general, and may apply even if the advanced pointer concept is not implemented. In that case, recursive parsing of the BC is performed for each care-of address found.

Once no destination address can be found in step 940, the data packet is sent, in step 970.

In the preferred embodiment of the present invention, recursive steps 930, 940, 950 and 960 in FIG. 9, that of searching for a list of care-of addresses in the binding cache, will preferably use a linked binding cache, as described with reference to FIG. 7 and FIG. 8. This will improve efficiency since the list of care-of addresses forming the optimal route to a destination can be found in a single step, with a so-called linked binding cache; as opposed to a non-linked binding caches where recursive parsing is then required.

Referring now to FIG. 10, a flowchart 1000 illustrates a method for building a linked binding cache, in accordance with the preferred embodiment of the present invention. The CN builds the linked binding cache based on binding update messages received from a number of MRs.

The process starts in step 1002, with the CN receiving a new binding cache (BC) entry from a MR in step 1004, which is any BC entry that has been received in a Binding Update. That is, the entry may be a completely new entry, or an update (new Co@, same Home Prefix (HP)) of an existing entry. The CN then starts a process of reviewing all BC entries, in step 1006, to determine any pointers between the new BC entry for that MR and any previously stored BC entries.

The process of reviewing all BC entries to determine any pointers between the new BC entry for that MR and any previously stored BC entry starts with the first BC entry in the linked binding cache. Making the current BC entry the first BC entry in the linked binding cache, as in step 1008, can readily do this. In addition, the preferred embodiment of the present invention uses two flags: (i) a Test_Up_Flag, and (ii) a Test_Down_Flag, which are both set to a 'true' status. The Test_Up_Flag is used to indicate whether to test if a current BC Entry points to "New BC Entry" or not. The Test_Down_ Flag indicates whether to test if a current BC Entry has to be pointed to by "New BC Entry" or not.

The home prefix (HP) of the current BC entry is then compared to the home prefix of the new BC entry for that MR, as shown in step 1010. Basically, if this determination is true, it identifies a "New BC Entry" as an update of an existing entry (since a single HP cannot have more than one Co@). Furthermore, if this test is true, then the "Current BC Entry" has been found that the entry "New BC Entry" has to update.

With regard to the use of flags, if the home prefix of the current BC entry matches the home prefix of the new BC entry for that MR, in step 1010, the Test_Up_Flag is set to a 'false' status, in step 1012. The care-of-address of the current BC entry is set to equal the new BC entry in step 1014.

Additionally, the pointer associated with the current BC entry is set to equal the pointer of the new BC entry, also in step 1014. This feature is important point as it erases a possible pointer from the 'Current BC Entry', which is no longer valid since Co@ has just changed, and replaces it with the pointer from the 'New BC Entry', if it exists.

The new BC entry is then made equal to the current BC entry, in step 1016, and the current BC entry moved to the next BC entry in the binding cache 1036 if the current BC entry is not the last entry in the Binding Cache 1034. This is required because the data structure of the 'New BC Entry' is dropped at the end of the process, as it is only used as an update.

A determination is then made again as to whether the home prefix of the current BC entry matches the home prefix of the new BC entry for that MR, in step 1010.

When there is no match, in step 1010, a determination is made as to whether the Test_Up_Flag is a 'true' status, as in step 1020. If the Test_Up_Flag is a 'true' status, in step 1020, a determination of whether the care-of-address of the current BC entry matches the home prefix of the new BC entry is made in step 1022. If there is no match, the method moves to step 1026. If there is a match, in step 1022, then a pointer is added from the current BC entry to the new BC entry, in step 1024.

The method then moves to step 1026, where a determination is made as to whether the Test_Down_Flag is a 'true' status. If the Test_Down_Flag is a 'true' status, in step 1026, a determination of whether the care-of-address of the new BC entry matches the home prefix of the current BC entry is made in step 1028. If there is no match, the method moves to step 1034. If there is a match, in step 1034, then a pointer is added from the new BC entry to the current BC entry, in step 1030. The Test_Down_Flag is then set to a 'false' status, as shown in step 1032.

A determination is made as to whether all of the BC entries have been checked, in step 1034. When the end of BC has been reached, a determination is still made as to whether the 'New BC Entry' was actually new, or if it was an update. If all of the BC entries have not yet been checked within this 'pass', i.e. the current BC entry is not the last BC entry in step 1034, a determination is made as to whether remaining entries in the linked binding cache have to be considered or not 1035. If both the Test_Up_Flag and Test_Down_Flag are set to 'false', there is no need to consider the remaining entries in the linked binding cache: the linked binding cache has been updated 1042 and the process ends 1044. If one of (or both) Test_Up_Flag and Test_Down_Flag is not set to 'false' the remaining entries in the linked binding cache need to be considered. Hence, the current BC entry is moved on to the next BC entry in step 1036. The process then moves to a determination of whether the home prefix of the current BC entry matches the home prefix of the new BC entry for that MR, in step 1010.

Otherwise, a determination is made as to whether the Test_Up_Flag is a 'true' status, in step 1038. If the Test_Up_Flag is a 'true' status, in step 1038, then a new BC entry is added at the end of the BC, in step 1040. This effectively means that the status has remained the same and that an entry to update has not been found whilst reviewing all BC entries. As a consequence, "New BC entry" has to be added at the end of the BC.

However, if the Test_Up_Flag is a 'false' status, in step 1038, the 'New BC Entry' was an update. Hence, the same prefix was found. Once all of the BC entries have been checked, the linked binding cache for that MR has been generated, in step 1042 and the process ends, in step 1044.

At the end of the process, either a New BC Entry will be added to the BC, or it will have updated an existing BC entry. In this manner, a linked binding cache can be generated for each and every new BC entry that is received by the CN. The linked binding cache can then be used in a much more efficient manner when data packets are to be sent through the network, as the route to each and every MNN, LFN can be quickly determined.

It is noted that step 1035 is a preferred option, in order to minimise cost, CPU run-time, etc. of the update of the BC. In other embodiments the process may, for example, follow steps 1034 to 1036.

Furthermore, it is noted that step 1026 is merely a preferred option in order to minimise cost, CPU run-time, etc. of the update of the BC. In other embodiments the process may, for example, follow steps 1020 to 1028.

Furthermore, the various steps described above need not necessarily be performed in the order they have been described. A skilled artisan would recognise that an alternative order may be used, where benefit can still be gained in the route optimisation process. For instance: the block formed with steps {1020, 1022, and 1024} can be made after the block formed with steps {1026, 1028, 1030, and 1032}.

Referring now to FIG. 11, the routing header 1120 according to the preferred embodiment of the present invention is shown. This routing header is included in data packets sent by CN to an intended recipient (in a Mobile Network). As previously indicated, the data packet 1100 includes a single IP header, incorporating an IP source address (CN address) 1110, and an IP destination address of the first intermediate address (MR1 care-of-address) 1115. The data packet includes further the routing header 1120 filled with IP intermediate addresses that form the route to the intended recipient, for example a LFN. Following the address information, the packet data (payload) is attached 1130.

It is within the contemplation of the invention that the aforementioned techniques of recursive parsing of a BC and/or use of an optimised linked binding cache may use any source routing mechanism. As such, the use of the routing header 1120 is a preferred option only. An alternative mechanism of source routing is also illustrated in FIG. 11.

In this regard, a tunneling operation is performed by the CN, when the CN wants to send a packet to an intended recipient (in a Mobile Network). The CN uses multiple encapsulations 1150 (i.e. multiple tunneling operations) of the data packet to source route the packet to the destination. In this regard, the data packet 1150 includes the first IP header, incorporating an IP source address (CN address) 1110, and an IP destination address of the first intermediate address (MR1 care-of-address) 1115, as in the preferred routing header. However, each intermediate IP header will have the sender address as the source address 1110 and one of the 'n' consecutive IP intermediate addresses 1160, 1170, etc., as the destination address. Finally, the original IP packet from the CN to the LFN will be included in the header, namely the addresses of the CN and LFN together with the packet data 1130.

It is to be appreciated that the arrangement and specific details of interfaces, address types, routers etc. in the above embodiments are merely examples, and the invention is not limited to these examples. The invention should be viewed as capable of being applied to other aspects of the Internet or other types of data networks or protocols and subnets thereof.

Furthermore, the invention may also be applied to networks other than the Internet, when such networks have subnets and access networks corresponding to those described above for the case of the Internet.

The invention, or at least embodiments thereof, tend to provide the following advantages, singly or in combination:
(i) A data packet may be transmitted much more efficiently, with a minimum of number of tunneling operations performed by intermediary home agents, thereby achieving improved route optimisation.
(ii) Route optimisation may be ascertained in a single step operation, based on extensive MR de-tunneling.
(iii) An improved binding cache (a linked binding cache) can be created and used with minimal additional processing or memory requirements.
(iv) A solution for efficient data routing in IPv6, IPv4 or similar data network protocol has been achieved, particularly for systems supporting nested network mobility.

Whilst the specific and preferred implementations of the embodiments of the present invention are described above, it is clear that one skilled in the art could readily apply variations and modifications of such inventive concepts. Thus, a mechanism, apparatus and associated methods to support route optimisation in Network mobility, especially in the case of IPv6, have been described, whereby the disadvantages associated with known mechanisms, apparatus and associated methods have been substantially alleviated. In particular, a mechanism, apparatus and associated methods to support route optimisation in the case of nested mobility, have been described.

The invention claimed is:

1. A method for building a linked binding cache, the method comprising the step of:
   storing a plurality of mobile router entries in a binding cache, wherein the plurality of mobile router entries include a first mobile router entry comprising a prefix and an indication of the prefix's length plus an associated intermediate address; and
   linking a second mobile router entry to the first mobile router entry for delivering at least one data packet via the first mobile router; and
   adding a pointer in the binding cache from the entry of the second mobile router to the first mobile router entry when the intermediate address of the second mobile router matches the first mobile router's prefix in order to create a linked binding cache.

2. The method for building a linked binding cache according to claim 1, the method further comprising:
   receiving a binding update message from a number of mobile routers to indicate their respective intermediate address in delivering at least one data packet to an intended recipient.

3. The method for building a linked binding cache according to claim 1, the method further comprising:
   receiving at least one tunneled data packet at a third mobile router;
   de-tunneling at least a portion of the at least one tunneled data packet, by the third mobile router; and tunneled
   sending a binding update message to a communication unit indicating the third mobile router as an intermediate router for passing on a data packet to the intended recipient to enable a pointer to be added in the linked binding cache from entry of the third mobile router to a second mobile router address.

4. The method for building a linked binding cache according to claim 1, wherein the step of receiving, de-tunneling and sending are performed by substantially each mobile router in a data path to the intended recipient, so that a linked binding cache for a data path route can be generated in a single step.

5. The method for building a linked binding cache according to claim 1, the method further comprising:
   comparing an intermediate address of said second mobile router to a prefix address of substantially each mobile router in said binding cache to determine whether a pointer should be added.

6. The method for building a linked binding cache according to claim 5, the method further comprising:
   comparing, when a match in said comparison step is found, substantially all other intermediate addresses to a prefix address of said second mobile router, to determine whether a pointer should be added to said second mobile router address; and
   repeating the comparison step process until no further match for an intermediate address is determined, thereby generating a preferred route to send at least one data packet to said recipient.

7. An apparatus in a system comprising a first mobile router and a second mobile router, the apparatus comprising:
   a memory for storing a plurality of mobile router entries in a binding cache, wherein the plurality of mobile router entries have a first mobile router entry comprising a prefix and an indication of the prefix's length plus an associated intermediate address; and
   a processor configured
      to link a second mobile router entry to the first mobile router entry for delivering at least one data packet via the first mobile router and
      to add a pointer in the binding cache from the entry of the second mobile router to the first mobile router entry when the intermediate address of the second mobile router matches the first mobile router's prefix in order to create a linked binding cache.

* * * * *